United States Patent
Feng et al.

(10) Patent No.: US 11,689,995 B2
(45) Date of Patent: Jun. 27, 2023

(54) INFORMATION TRANSMISSION METHOD AND APPARATUS

(71) Applicant: HUAWEI TECHNOLOGIES CO., LTD., Shenzhen (CN)

(72) Inventors: Zhenni Feng, Shenzhen (CN); Wenqi Sun, Shenzhen (CN); Wei Tan, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 51 days.

(21) Appl. No.: 17/179,552

(22) Filed: Feb. 19, 2021

(65) Prior Publication Data
US 2021/0176699 A1 Jun. 10, 2021

Related U.S. Application Data

(63) Continuation of application No. PCT/CN2019/102038, filed on Aug. 22, 2019.

(30) Foreign Application Priority Data

Aug. 22, 2018 (CN) .......................... 201810957704.6

(51) Int. Cl.
  *H04W 48/16* (2009.01)
  *H04W 48/10* (2009.01)
  (Continued)

(52) U.S. Cl.
  CPC ........... *H04W 48/16* (2013.01); *H04W 48/10* (2013.01); *H04W 48/18* (2013.01); *H04W 88/02* (2013.01); *H04W 88/08* (2013.01)

(58) Field of Classification Search
  CPC ............................................. H04W 48/16–20
  See application file for complete search history.

(56) References Cited

U.S. PATENT DOCUMENTS

2013/0196631 A1* 8/2013 Vanderveen ...... H04W 12/0431
  455/411
2014/0119267 A1 5/2014 Santhanam et al.
(Continued)

FOREIGN PATENT DOCUMENTS

CN  1980463 A   6/2007
CN  103634849 A  3/2014
(Continued)

OTHER PUBLICATIONS

Haihua,li,:"Study of IPTV Architecture Integrating P2P and NGN",Jan. 1, 2009,total 6 pages.
(Continued)

*Primary Examiner* — Qutbuddin Ghulamali
(74) *Attorney, Agent, or Firm* — Rimon PC

(57) ABSTRACT

This application provides an information transmission method when a terminal device accesses a serving radio access network (RAN) device. The terminal device receives an identifier of a first cluster-data function (C-DF) associated with the serving RAN device from the serving RAN device, where the first C-DF is located in a radio access network and stores current data of the terminal device. When the terminal device camps on the serving RAN device longer than or equal to a first threshold, the terminal device stores the identifier of the first C-DF.

11 Claims, 7 Drawing Sheets

(51) Int. Cl.
*H04W 48/18* (2009.01)
*H04W 88/02* (2009.01)
*H04W 88/08* (2009.01)

(56) References Cited

U.S. PATENT DOCUMENTS

2015/0223190 A1* 8/2015 Backman ............ H04W 64/003
370/328
2017/0164419 A1   6/2017 Kim
2018/0063334 A1   3/2018 Nanjundan et al.

FOREIGN PATENT DOCUMENTS

| CN | 106559832 A | 4/2017 |
| CN | 106559833 A | 4/2017 |
| CN | 106559838 A | 4/2017 |
| CN | 108377530 A | 8/2018 |
| EP | 2547148 A1 | 1/2013 |
| WO | 2016094019 A1 | 6/2016 |

OTHER PUBLICATIONS

RAN WG3 Meeting #93,R3-161759,RAN Support for Core Network ,Huawei,Slicing,Gothenburg, Sweden, Aug. 22-26, 2016,total 13 pages.
3GPP TS 38.300 V15.2.0 (Jun. 2018);3rd Generation Partnership Project Technical Specification Group Radio Access Network;NR; NR and NG-RAN Overall Description;Stage 2(Release 15);total 87 pages.

* cited by examiner

INFORMATION TRANSMISSION METHOD AND APPARATUS

CROSS-REFERENCE TO RELATED APPLICATIONS

This application is a continuation of International Application No. PCT/CN2019/102038, filed on Aug. 22, 2019, which claims priority to Chinese Patent Application No. 201810957704.6, filed on Aug. 22, 2018. The disclosures of the aforementioned applications are hereby incorporated by reference in their entireties.

TECHNICAL FIELD

The present embodiments relate to the wireless communications field, and in particular, to an information transmission method and apparatus.

BACKGROUND

With rapid development of wireless communications technologies, a 5th generation (5G) wireless communications technology has been a popular subject in the industry currently. 5G supports a variety of application requirements, for example, supports an access capability characterized by higher-rate experience and higher bandwidth, information exchange characterized by a lower latency and higher reliability, larger-scale and lower-cost access and management of machine type communications devices, and the like. In addition, 5G supports various vertical-industry application scenarios oriented to the internet of vehicles, emergency communication, industrial internet, and the like. Diversified communication scenarios lead to massive data generated by terminal devices in a network, especially data generated in a process in which a terminal device moves and performs communication within a coverage area of a wireless network. How to store and obtain the massive data of the terminal devices in an access network becomes a problem to be resolved for intelligent management and 5G network optimization.

SUMMARY

Embodiments of this application provide an information transmission method, to transmit, among a terminal device, a radio access network (RAN) device, and different C-DFs, information about a cluster-data function (C-DF) that stores data of the terminal device.

According to one aspect, an embodiment of this disclosure provides an information transmission method. In the method, a terminal device accesses a serving radio access network (RAN device); the terminal device receives an identifier of a first cluster-data function (C-DF) that is sent by the serving RAN device, where the serving RAN device is associated with the first C-DF, and the first C-DF is located in an access network and stores current data of the terminal device; and when the duration in which the terminal device camps on the serving RAN device is greater than or equal to a first threshold, the terminal device stores the identifier of the first C-DF.

In one embodiment, a value of the first threshold is 0, and the terminal device directly stores the identifier of the first C-DF.

In one embodiment, that the terminal device receives an identifier of a first C-DF that is sent by the serving RAN device includes: the terminal device receives, through unicast signaling, the identifier of the first C-DF that is sent by the serving RAN device, or receives the identifier of the first C-DF in a broadcast message of the serving RAN device.

In one embodiment, that the terminal device receives an identifier of a first C-DF that is sent by the serving RAN device includes: when the duration in which the terminal device camps on the serving RAN device is greater than or equal to a second threshold, the terminal device receives, through unicast signaling, the identifier of the first C-DF that is sent by the serving RAN device.

In one embodiment, before the terminal device stores the identifier of the first C-DF, the method further includes: the terminal device sends an identifier of a second C-DF to the serving RAN device, where the identifier of the second C-DF is stored by the terminal device before the terminal device accesses the serving RAN device, and the second C-DF stores historical data of the terminal device. In this operation, the serving RAN device can learn of information about the C-DF that stores the historical data of the terminal device.

In one embodiment, when the duration in which the terminal device camps on the serving RAN device is greater than or equal to the first threshold, the terminal device replaces the identifier of the second C-DF with the identifier of the first C-DF. In this operation, the terminal device stores information about the C-DF that stores the current data of the terminal device.

In one embodiment, after receiving the identifier of the first C-DF, the terminal device replaces the identifier of the second C-DF with the identifier of the first C-DF.

In one embodiment, the identifier of the second C-DF is an identifier of a home C-DF of the terminal device.

In one embodiment, the identifier of the first C-DF is an identifier of a RAN device on which the first C-DF is deployed, or an identifier of a cell controlled by the RAN device.

In one embodiment, the identifier of the second C-DF is an identifier of a RAN device on which the second C-DF is deployed, or an identifier of a cell controlled by the RAN device.

According to the foregoing operations in this embodiment of this application, the terminal device can learn of the C-DF that stores the current data of the terminal device, and may further report, to a network, the C-DF that stores the historical data of the terminal device. In this way, information about a C-DF that stores data of the terminal device is effectively transmitted between the terminal device and the RAN device.

According to another aspect, an embodiment of this application provides an information transmission method. The method includes: A radio access network (RAN) device obtains an identifier of an associated first cluster-data function (C-DF), where the first C-DF is located in an access network and stores current data of a terminal device; and the RAN device sends the identifier of the first C-DF to the terminal device.

In one embodiment, that the RAN device sends the identifier of the first C-DF to the terminal device includes: the RAN device sends the identifier of the first C-DF to the terminal device through unicast signaling, or broadcasts the identifier of the first C-DF to a service area.

In one embodiment, that the RAN device sends the identifier of the first C-DF to the terminal device includes: when duration in which the terminal device camps on the RAN device is greater than or equal to a second threshold, the RAN device sends the identifier of the first C-DF to the terminal device through unicast signaling.

In one embodiment, the method further includes: the RAN device receives an identifier of a second C-DF that is sent by the terminal device. In this operation, the RAN device can learn of information about the C-DF that stores historical data of the terminal device.

In one embodiment, the RAN device may obtain the identifier of the second C-DF from another network entity, for example, another RAN device or a core network device.

In one embodiment, the RAN device obtains the identifier of the second C-DF from the core network device by using an initial UE context setup request message.

In one embodiment, the RAN device obtains the identifier of the second C-DF from an anchor RAN device by using a retrieve UE context response message.

In one embodiment, the RAN device obtains the identifier of the second C-DF from a source RAN device by using a handover request message, or obtains the identifier of the second C-DF from the core network device by using a path switch request acknowledgement message.

In one embodiment, the method further includes: when the identifier of the second C-DF is different from the identifier of the first C-DF, the RAN device reports an identifier of the terminal device and the identifier of the second C-DF to the first C-DF. In this operation, the C-DF can learn of the information about the C-DF that stores the historical data of the terminal device.

In one embodiment, the identifier of the first C-DF is an identifier of a home C-DF of the terminal device.

In one embodiment, the identifier of the first C-DF is an identifier of a RAN device on which the first C-DF is deployed, or an identifier of a cell controlled by the RAN device.

In one embodiment, the identifier of the second C-DF is an identifier of a RAN device on which the second C-DF is deployed, or an identifier of a cell controlled by the RAN device.

According to the foregoing operations in this embodiment of this application, the RAN device can notify the terminal device of the C-DF that stores the current data of the terminal device, and may further learn, from the terminal device, of the C-DF that stores the historical data of the terminal device. In this way, information about a C-DF that stores data of the terminal device is effectively transmitted between the terminal device and the RAN device.

According to yet another aspect, an embodiment of this application provides an information transmission method. The method includes: A first cluster-data function (C-DF) receives an identifier of a terminal device and an identifier of a second C-DF that are sent by at least one associated RAN device, where the first C-DF is located in an access network and stores current data of the terminal device, and an identifier of the first C-DF is different from the identifier of the second C-DF; and the first C-DF obtains data of the terminal device from the second C-DF.

In one embodiment, the first C-DF may obtain the identifier of the second C-DF from another network entity, for example, another RAN device or a core network device.

In one embodiment, the identifier of the second C-DF is an identifier of a RAN device on which the second C-DF is deployed, or an identifier of a cell controlled by the RAN device.

According to the foregoing operations in this embodiment of this application, a C-DF associated with a serving RAN device accessed by the terminal device can obtain historical data of the terminal device from another C-DF. In this way, data of the terminal device is effectively transmitted between different C-DFs.

According to still another aspect, a terminal device is provided, and is configured to perform the method in any one of the first aspect or the possible implementations of the first aspect. Specifically, the terminal device may include units configured to perform the method in any one of the first aspect or the possible implementations of the first aspect.

According to another aspect, a radio access network (RAN) device is provided, and is configured to perform the method in any one of the second aspect or the possible implementations of the second aspect. Specifically, the RAN device may include units configured to perform the method in any one of the second aspect or the possible implementations of the second aspect.

According to yet anther aspect, a cluster-data function (C-DF) is provided, and is configured to perform the method in any one of the third aspect or the possible implementations of the third aspect. Specifically, the C-DF may include units configured to perform the method in any one of the third aspect or the possible implementations of the third aspect.

According to still another aspect, another terminal device is provided, including a memory and a processor. The memory is configured to store a computer program, and the processor is configured to invoke the computer program from the memory and run the computer program, so that the terminal device performs the method in any one of the first aspect or the possible implementations of the first aspect.

According to another aspect, another radio access network (RAN) device is provided, including a memory and a processor. The memory is configured to store a computer program, and the processor is configured to invoke the computer program from the memory and run the computer program, so that the RAN device performs the method in any one of the second aspect or the possible implementations of the second aspect.

According to yet another aspect, another cluster-data function (C-DF) is provided, including a memory and a processor. The memory is configured to store a computer program, and the processor is configured to invoke the computer program from the memory and run the computer program, so that the C-DF performs the method in any one of the third aspect or the possible implementations of the third aspect.

According to still another aspect, an embodiment of the present disclosure provides a communications system, including a terminal device, a radio access network (RAN) device, and a cluster-data function (C-DF). The terminal device is the terminal device according to the first aspect, the RAN device is the RAN device according to the second aspect, and the C-DF is the C-DF device according to the third aspect.

According to another aspect, a computer program product is provided, where the computer program product includes computer program code, and when the computer program code is executed by a communications unit and a processing unit or a transceiver and a processor of a terminal device, the terminal device is enabled to perform the method in any one of the first aspect or the possible implementations of the first aspect.

According to yet another aspect, a computer program product is provided, where the computer program product includes computer program code, and when the computer program code is executed by a communications unit and a processing unit or a transceiver and a processor of a radio access network (RAN) device, the RAN device is enabled to perform the method in any one of the second aspect or the possible implementations of the second aspect.

According to still another aspect, a computer program product is provided, where the computer program product includes computer program code, and when the computer program code is executed by a communications unit and a processing unit or a transceiver and a processor of a cluster-data function (C-DF), the C-DF is enabled to perform the method in any one of the third aspect or the possible implementations of the third aspect.

According to another aspect, a computer-readable storage medium is provided, and is configured to store a computer software program instruction used by the foregoing terminal device. When the program instruction is executed by the terminal device, the terminal device is enabled to perform the method in any one of the first aspect or the possible implementations of the first aspect.

According to yet another aspect, a computer-readable storage medium is provided, and is configured to store a computer software program instruction used by the foregoing radio access network (RAN) device. When the program instruction is executed by the RAN device, the RAN device is enabled to perform the method in any one of the second aspect or the possible implementations of the second aspect.

According to still another aspect, a computer-readable storage medium is provided, and is configured to store a computer software program instruction used by the foregoing cluster-data function (C-DF). When the program instruction is executed by the C-DF, the C-DF is enabled to perform the method in any one of the third aspect or the possible implementations of the third aspect.

These and other aspects of the present disclosure are clearer and easier to understand in descriptions of the following (plurality of) embodiments.

DESCRIPTION OF EMBODIMENTS

Figure 1:
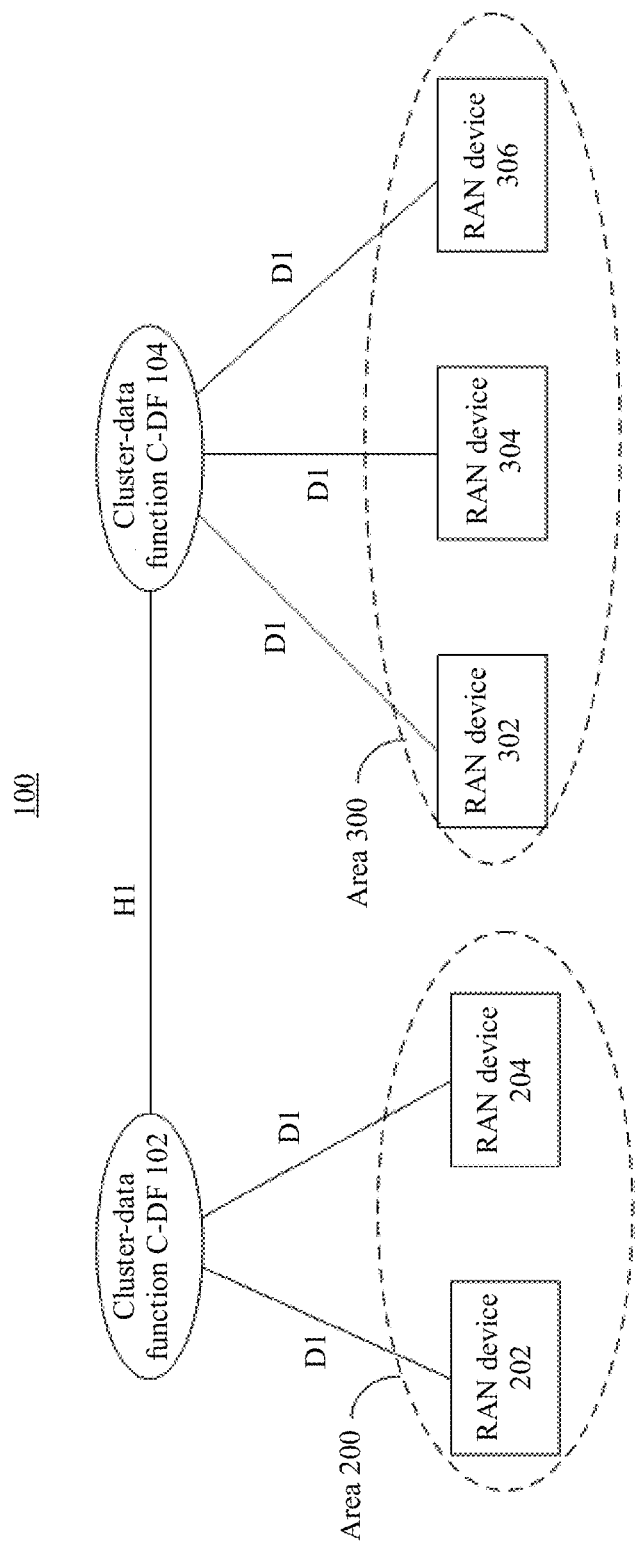
FIG. 1 is a schematic diagram of an intelligent RAN architecture according to an embodiment of this application.

The following describes the embodiments of this application with reference to the accompanying drawings in the embodiments of this application.

In this application, the word "example" is used to represent giving an example, an illustration, or a description. Any embodiment described as "example" in this application should not be explained as being more preferred or having more advantages than another embodiment. To enable any person skilled in the art to implement and use the present disclosure, the following description is provided. In the following description, details are set forth for the purpose of explanation. It should be understood by a person of ordinary skill in the art that the present disclosure can be implemented without these specific details. In other examples, well-known structures and processes are not described in detail to avoid obscuring the description of the present disclosure with unnecessary details. Therefore, the present disclosure is not limited to the described embodiments but extends to the widest scope that complies with the principles and features disclosed in this application.

In the specification, claims, and above accompanying drawings of the present disclosure, the terms "first", "second", "third", "fourth", and the like (if exists) are intended to distinguish between similar objects but do not necessarily indicate a specific order or sequence. It should be understood that data termed in such a way is interchangeable in proper circumstances so that the embodiments of this application described herein can be implemented in other orders than the order illustrated or described herein. Moreover, the terms "include", "contain", and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Specific embodiments are used below to describe in detail the technical solutions of the present disclosure. The following several specific embodiments may be combined with each other, and a same or similar concept or process may not be described repeatedly in some embodiments.

In the 5G communications era, a terminal device may be used in diversified communication scenarios and may support various types of services, such as mobile broadband communication, industrial internet, internet of things, internet of vehicles communication, and mobile medical communication. Various types of communication of the terminal device generate massive data in an access network, for example, parameters configured by the access network for the terminal device in various communication scenarios, movement-related data of the terminal device (such as a list of cells on which the terminal device camps, a time of camping on a cell, and inter-cell handover event data), and communication performance and statistical data of the terminal device (such as a traffic characteristic of the terminal device and measurement report data of the terminal device). The data of the terminal device on the access network is very valuable, and may be used to optimize a design of the access network, so that the network better serves the terminal device in diversified services. The inventor finds that, based on an existing radio access network (RAN), a new RAN architecture integrating data collection of terminal devices, data model training, and model application may be established by constructing an intelligent RAN architecture, so as to fully utilize massive data of the terminal devices in a network. In this way, based on an optimization policy and an optimization model in a big data technology, functions of an existing RAN device are supported, optimized, or extended, and RAN performance is optimized. For example, a network handover algorithm is optimized, network load balancing is implemented, and mobile edge computing is optimized.

FIG. 1 is a schematic diagram of an intelligent RAN architecture, which mainly includes RAN devices (202, 204, 302, 304, and 306) and cluster-data functions (102 and 104). A cluster-data function (C-DF) is an intelligent control function entity in the intelligent RAN architecture, and is configured to: collect and process data of a terminal device served by a RAN device in a cluster, and manage the RAN device in the cluster. One C-DF is connected to one or more RAN devices through one or more interfaces (for example, a D1 interface). In other words, one C-DF is associated with one or more RAN devices. The C-DF stores data in the cluster managed by the C-DF, for example, data of one or more RAN devices in the cluster and/or data of one or more terminal devices served by the one or more RAN devices. In particular, the C-DF stores behavior information of the terminal device served in the cluster managed by the C-DF, to optimize performance in a service area of the cluster. Specifically, the C-DF is a regional intelligent control function entity. As shown in FIG. 1, the C-DF 102 manages the RAN devices 202 and 204 in an area 200, and the C-DF 104 manages the RAN devices 302, 304, and 306 in an area 300. The C-DF 102 and the C-DF 104 are interconnected through an interface (for example, an H1 interface). The C-DF has functions such as storage, computing, data opening, and coordination control, and mainly has the following functions: collecting, through a D1 interface, related data that is obtained by a RAN device during communication with a terminal device, storing data and supporting data opening, intelligent computing, executing a corresponding machine learning/artificial intelligence algorithm, supporting policy training by levels (such as a base station level and a network slice level), storing trained algorithm parameters/models, applying decomposition models to different RAN devices, configuring a RAN device through a D1 interface, and coordinating operations between a plurality of RAN devices. One RAN device is associated with one C-DF. The RAN device may send data of the RAN device and/or data of one or more terminal devices served by the RAN device to the associated C-DF for storage. It should be understood that the C-DF is merely an example name of the intelligent control function entity in the intelligent RAN architecture, and the intelligent control function entity may have another name. This is not specifically limited in this application. Optionally, the RAN device also has a partial intelligent control function. For example, the RAN device has a data function (DF), and may be configured to: collect data of a terminal device in a service area of the RAN device, extract characteristic data of the terminal device, preprocess the data, forward the data of the terminal device to the associated C-DF to support a function of the C-DF, execute a policy delivered by the C-DF, and optimize models. It should be understood that the DF is merely an example name of a function entity that is located in the RAN device and that has partial intelligent control in the intelligent RAN architecture. The function entity may have another name. This is not specifically limited in this application. Optionally, a C-DF may be further deployed on a RAN device, to manage the RAN device and another RAN device. It should be understood that in this case, an identifier of the C-DF may be an identifier of the RAN device on which the C-DF is deployed, or an identifier of a cell managed by the RAN device. In this case, the RAN device and the another RAN device may also have DFs.

Figure 2:
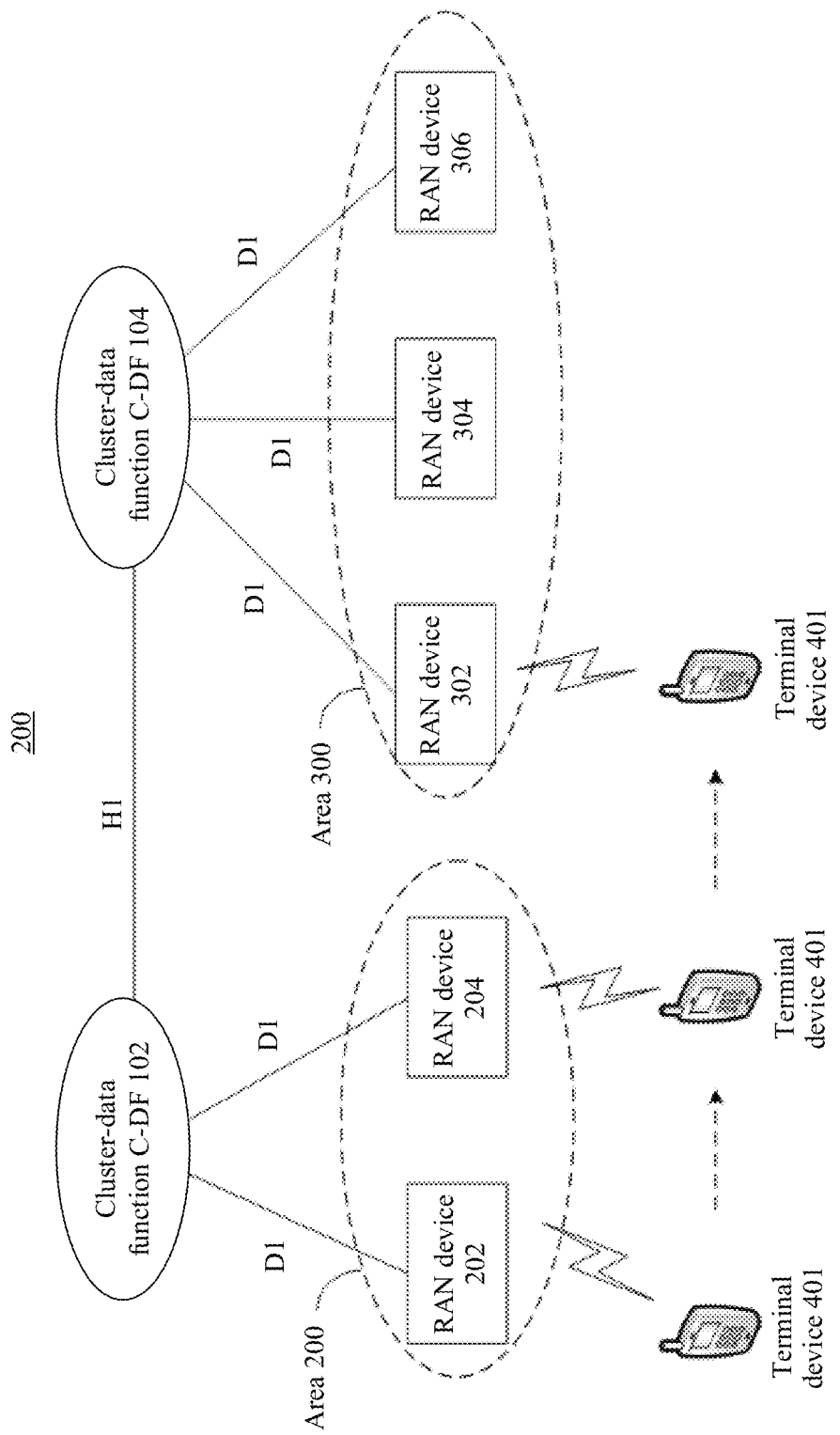
FIG. 2 is a schematic diagram of handover of a terminal device in an intelligent RAN according to an embodiment of this application.

FIG. 2 is a schematic diagram of handover of a terminal device in an intelligent RAN. The terminal device 401 is handed over from a RAN device 202 to a RAN device 204, and then is handed over to a RAN device 302. When the terminal device 401 performs communication within a service area of the RAN device 202, data of the terminal device 401 may be collected by the RAN device 202 and stored in a C-DF 102. When the terminal device 401 performs communication within a service area of the RAN device 204, data of the terminal device 401 may be collected by the RAN device 204 and stored in the C-DF 102. Therefore, when the terminal device 401 is handed over from the RAN device 202 to the RAN device 204, because the RAN device 202 and the RAN device 204 are in a same area 200, the C-DF that stores data of the terminal device 401 in a network does not change. To be specific, the historical data of the terminal device 401 in the service area of the RAN device 202 and the current data of the terminal device 401 in the service area of the RAN device 204 are both stored in the C-DF 102. Further, when the terminal device is handed over to the RAN device 302 and establishes communication with the RAN device 302, data of the terminal device may be collected by the RAN device 302 and stored in a C-DF 104. Because the RAN device 204 and the RAN device 302 are located in different areas, the C-DF 104 stores current data of communication between the terminal device 401 and the RAN device 302, and the C-DF 102 stores historical data of communication between the terminal device 401 and each of the RAN device 202 and the RAN device 204. The inventor further finds that in this case, the C-DF 104 needs to obtain the historical data of the terminal device 401 from the C-DF 102, and combine the historical data with the current data of the terminal device, so as to optimize the network. Therefore, the embodiments of this application provide a technical solution for transmitting information.

In an actual system, the RAN device shown in FIG. 1 and FIG. 2 may be a next-generation base station, for example, a next-generation NodeB (gNB) or a next-generation evolved NodeB (ng-eNB), or may be an access point (AP) in a wireless local area network (WLAN), an evolved NodeB (eNB or eNodeB) in LTE, a relay node or an access point, a vehicle-mounted device, a wearable device, a transmission and reception point (TRP), or the like. It should be understood that the terminal device communicates with an access network device by using a transmission resource (for example, a frequency domain resource, a time domain resource, or a code domain resource) used in a cell managed by the RAN device. The cell may be a macro cell, a hyper cell, or a small cell. The small cell herein may include a metro cell, a micro cell, a pico cell, a femto cell, or the like. These small cells have characteristics such as a small coverage area and low transmit power, and are applicable to providing a high-rate data transmission service. The terminal device in FIG. 2 may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a WLAN, a cellular phone, a cordless phone, a SIP phone, a wireless local loop (WLL) station, a personal digital assistant (PDA) device, a handheld device with a wireless communication function, a relay device, a computing device or another processing device coupled to a wireless modem, a vehicle-mounted device, a wearable device, or a next-generation communications system, such as a terminal device in a 5G network or a terminal device in a future evolved public land mobile network (PLMN). By way of example but not limitation, in the embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn on a body or integrated into clothes or an accessory of a user. The wearable device is not only a hardware device, but is used to implement a powerful function through software support, data exchange, and cloud interaction. Generalized wearable intelligent devices include full-featured and large-size devices that can implement a complete or partial function without depending on smartphones, for example, smart watches or smart glasses, and devices that focus on only one type of application function and need to work with other devices such as smartphones, for example, various smart bands or smart jewelry for monitoring physical signs.

Figure 3:
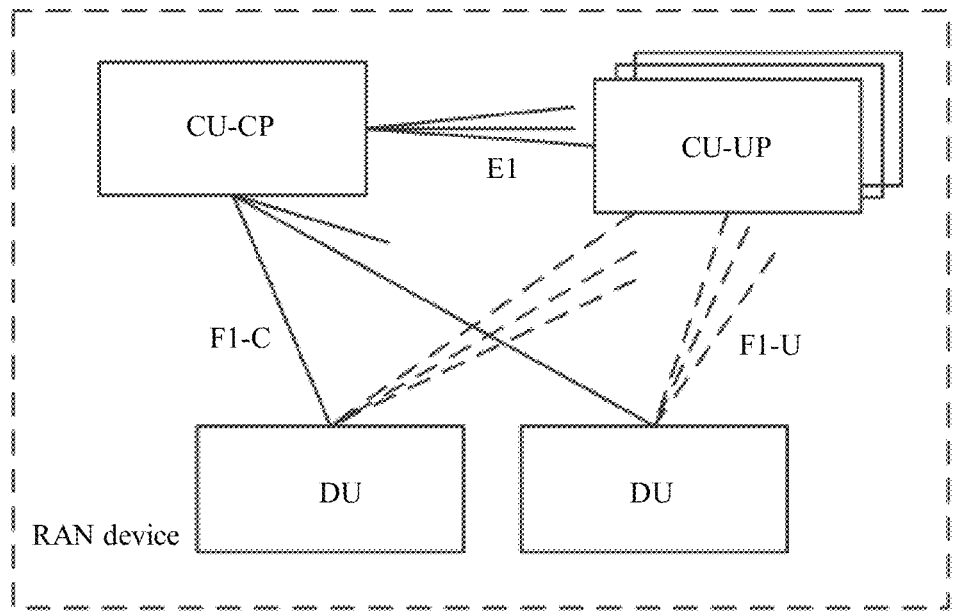
FIG. 3 is a schematic diagram of a RAN device divided into central units and distributed units according to an embodiment of this application.

Optionally, in a 5G system, a RAN device may be further divided into a central unit (CU) and a distributed unit (DU) according to a protocol stack. The CU is responsible for operations at a radio resource control (RRC) layer, a service data adaptation protocol (SDAP) layer, and a packet data convergence protocol (PDCP) layer. The DU is responsible for operations at a radio link control (RLC) layer, a media access control (MAC) layer, and a physical (PHY) layer. Further, the CU may be divided into a control plane central unit (CU-CP) and a user plane central unit (CU-UP). The CU-CP is responsible for control plane processing at the RRC layer and the PDCP layer, and the CU-UP is responsible for user plane processing at the SDAP layer and the PDCP layer. FIG. 3 shows an architecture of a RAN device divided into a CU-CP, a CU-UP, and a DU. One RAN device may include one CU-CP, one or more CU-UPs, and one or more DUs. One CP-UP is connected to only one CU-CP through an E1 interface. One DU is connected to only one CU-CP through an F1-C interface. Under control of the CU-CP, one DU may be connected to one or more CU-UPs, one CU-UP may be connected to one or more DUs, and the CU-UP is connected to the DU through an F1-U interface. It should be noted that, to maintain network resilience, one DU and/or one CU-UP may be alternatively connected to a plurality of CU-CPs. It should be understood that the foregoing protocol stack-based division manner in which the RAN device is divided into the CU and the DU is merely an example, and the RAN device may be alternatively divided into the CU and the DU in another protocol stack-based division manner. For example, the CU may be responsible for an operation at the RLC layer, or the DU is responsible for a user plane operation at the PDCP layer. This is not specifically limited in this application. In this case, a C-DF associated with the RAN device may be interconnected to the CU-UP of the RAN device, or may be interconnected to one or more CU-UPs of the RAN device. For this type of RAN device architecture, the embodiments of this application also provide a technical solution for transmitting information.

Figure 4:
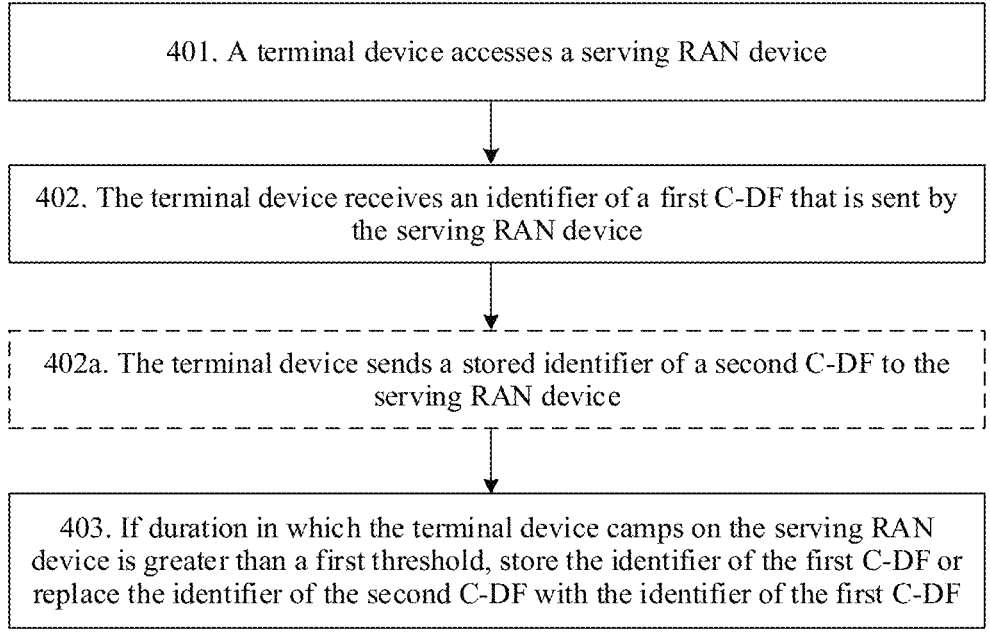
FIG. 4 is a schematic flowchart of an information transmission method according to an embodiment of this application.

FIG. 4 is a schematic flowchart of an information transmission method according to an embodiment of this application. The method 400 may be applied to a terminal device to transmit information between the terminal device and the RAN device shown in FIG. 2. A procedure shown in FIG. 4 includes the following operations.

401. The terminal device accesses a serving RAN device.

In this operation, the terminal device accesses one or more RAN devices in a network, and establishes communication with the one or more RAN devices. In a possible implementation, the terminal device accesses one RAN device in the network and establishes communication. The RAN device is referred to as the serving RAN device of the terminal device. In another possible implementation, in a dual-connectivity or multi-connectivity mode, the terminal device accesses at least two RAN devices in the network and establishes communication. The at least two RAN devices may simultaneously or successively provide services for the terminal device. In this case, one of the at least two RAN devices is referred to as a master RAN device, and mainly carries transmission of control plane data and user plane data of the terminal device. Another RAN device in the at least two RAN devices is referred to as a secondary RAN device, and mainly carries transmission of user plane data of the terminal device. The master RAN device is referred to as the serving RAN device.

For a RAN device on which CU-DU division is performed, a control plane data channel of the terminal device is a connection through one or more DUs to a CU-CP and then to a core network device, and a user plane data channel of the terminal device is a connection through one or more DUs to one or more CU-UPs and then to the core network device.

The terminal device may access the serving RAN device in a plurality of scenarios. For example, the terminal device may access the serving RAN device after being powered on, the terminal device may switch from an idle mode to a connected mode and access the serving RAN device, the terminal device may switch from an inactive mode to a connected mode and access the serving RAN device, or the terminal device may access a target RAN device (in this case, the target RAN device is referred to as the serving RAN device) from a source RAN device in a handover procedure.

402. The terminal device receives an identifier of a first C-DF that is sent by the serving RAN device.

The identifier of the first C-DF is an identifier of a C-DF associated with the serving RAN device. It should be understood that the identifier of the first C-DF may be in a form of a character, may be in a form of a number, or may be in a form of a combination of a character and a number. A form of the identifier of the first C-DF is not specifically limited in this application.

In this operation, the terminal device may receive, through unicast signaling, the identifier of the first C-DF that is sent by the serving RAN device, or may receive the identifier of the first C-DF by reading a broadcast message of the serving RAN device.

For the RAN device on which CU-DU division is performed, the terminal device receives the identifier of the first C-DF that is sent by one or more DUs of the serving RAN device.

403. If a duration in which the terminal device camps on the serving RAN device is greater than or equal to a first threshold, store the identifier of the first C-DF.

In this operation, the terminal device determines whether the duration of communication with the serving RAN device from the moment of accessing the serving RAN device is greater than or equal to the first time threshold. The duration in which the terminal device communicates with the serving RAN device from the moment of accessing the serving RAN device is referred to as the duration in which the terminal device camps on the serving RAN device. The value of the first time threshold is a non-negative number, and may be preconfigured by the serving RAN device (for example, by using a network management system), may be determined through negotiation between the terminal device and the serving RAN device, or may be dynamically adjusted by the serving RAN device based on a network status and notified to the terminal device. It should be understood that a manner of setting the first time threshold is an example. The manner of setting the first time threshold is not specifically limited in this application.

When the duration in which the terminal device camps on the serving RAN device is greater than or equal to the first time threshold, the identifier of the first C-DF is retained. When the duration in which the terminal device camps on the serving RAN device is greater than or equal to the first time threshold, it indicates that the duration in which the terminal device camps on the serving RAN device is long enough, so that the communication data generated when the terminal device camps on the serving RAN device has a specific statistical meaning, and statistics information about behavior and service performance of the terminal device may be provided, and may be used for network optimization and the like. Optionally, in operation 403, the terminal device directly stores the identifier of the first C-DF. This corresponds to the case in which the first time threshold is 0. The terminal device stores the identifier of the first C-DF, to learn of a specific C-DF that stores the data of the terminal device.

Optionally, only when the duration in which the terminal device camps on the serving RAN device is greater than or equal to a second threshold, the terminal device receives, in the foregoing operation 402, the identifier of the first C-DF that is sent by the serving RAN device. The value of the second time threshold is a non-negative number, and may be preconfigured by the serving RAN device (for example, by using a network management system), may be determined through negotiation between the terminal device and the serving RAN device, or may be dynamically adjusted by the serving RAN device based on a network status and notified to the terminal device. It should be understood that a manner of setting the second time threshold is an example. The manner of setting the second time threshold is not specifically limited in this application. It should be understood that the second time threshold should be less than or equal to the first time threshold. Particularly, when the first time threshold is equal to the second time threshold, in operation 403, the terminal device directly stores the identifier of the first C-DF.

Optionally, before operation 403, operation 402a is further included.

402a. The terminal device sends a stored identifier of a second C-DF to the serving RAN device.

For the RAN device on which CU-DU division is performed, the terminal device sends the stored identifier of the second C-DF to one or more DUs of the serving RAN device.

Optionally, the terminal device already stores the identifier of the second C-DF before accessing the serving RAN device. The identifier of the second C-DF is used to indicate the C-DF that stores historical data of the terminal device before the terminal device accesses the serving RAN device. In this operation, the terminal device sends the stored identifier of the second C-DF to the serving RAN device. It should be understood that the terminal device does not necessarily store the identifier of the second C-DF before accessing the serving RAN device. For example, when the terminal device is powered on and accesses the serving RAN device, the terminal device may not have any C-DF identifier. When the terminal device is handed over from a source RAN device to a target RAN device, the terminal device may store an identifier of a C-DF associated with the source RAN device. The C-DF associated with the source RAN device stores data of the terminal device that is generated when the terminal device communicates with the source RAN device, namely, historical data of the terminal device. When the terminal device enters a connected mode from an idle mode, the terminal device may store an identifier of a C-DF storing historical data of the terminal device that is generated when the terminal device communicates with a RAN device before the terminal device enters the idle mode. In some scenarios, for example, if the terminal device stays or is active in a geographic area for a relatively long time, data of the terminal device may be stored in a home C-DF. In this case, the identifier of the second C-DF may be an identifier of the home C-DF of the terminal device.

It should be understood that the identifier of the second C-DF may be the same as the identifier of the first C-DF, or may be different from the identifier of the first C-DF. For example, if the source RAN device and the target RAN device of handover of the terminal device are in a management area of a same C-DF, the source RAN device and the target RAN device are associated with the same C-DF, and the identifier of the second C-DF is the same as the identifier of the first C-DF.

Optionally, when the terminal device stores the identifier of the second C-DF, in operation 402a, the terminal device sends the identifier of the second C-DF to the serving RAN device only when the identifier of the second C-DF is different from the identifier of the first C-DF.

After operation 402a is performed, in operation 403, if the duration in which the terminal device camps on the serving RAN device is greater than or equal to the first threshold, the terminal device replaces the previously stored identifier of the second C-DF with the received identifier of the first C-DF. In other words, the terminal device deletes the identifier of the second C-DF and stores the identifier of the first C-DF.

Optionally, if the identifier of the second C-DF is the same as the identifier of the first C-DF, the terminal device may not perform operation 403.

According to the foregoing operations in this embodiment of this application, the terminal device can learn of the C-DF that stores the current data of the terminal device, and may further report, to a network, the C-DF that stores the historical data of the terminal device. In this way, information about a C-DF that stores data of the terminal device is effectively transmitted between the terminal device and the RAN device.

Figure 5:
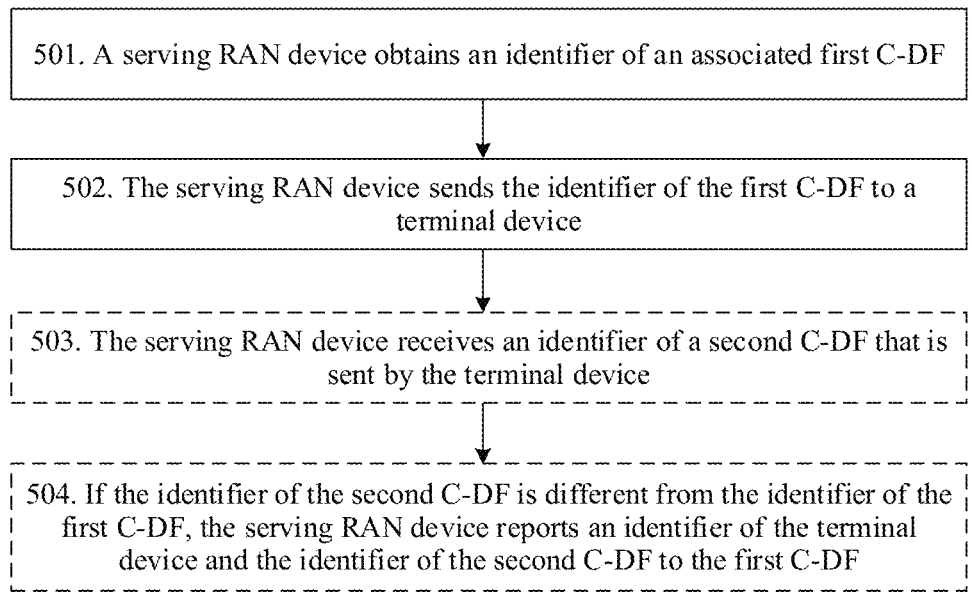
FIG. 5 is a schematic flowchart of another information transmission method according to an embodiment of this application.

FIG. 5 is a schematic flowchart of an information transmission method according to an embodiment of this application. The method 500 may be applied to a RAN device to transmit information between the RAN device and the terminal device shown in FIG. 2. A procedure shown in FIG. 5 includes the following operations.

501. A serving RAN device obtains an identifier of a first C-DF.

In an intelligent RAN architecture, one RAN device is associated with one C-DF. In this operation, the serving RAN device obtains the identifier of the first C-DF associated with the serving RAN device. The serving RAN device may obtain the identifier of the first C-DF in a plurality of manners. For example, the serving RAN device may obtain the identifier that is configured by a system and that is of the first C-DF associated with the serving RAN device. Alternatively, the serving RAN device may obtain, by interacting with another device (for example, at least one C-DF) in a network, the identifier of the first C-DF currently associated with the serving RAN device, and may store the identifier in a DF. Alternatively, the serving RAN device may obtain the identifier of the first C-DF that is pre-stored by the serving RAN device. Alternatively, the serving RAN device may obtain the identifier of the first C-DF from a DF. It should be understood that the foregoing manners in which the serving RAN device obtains the identifier of the first C-DF are examples. The manner in which the serving RAN device obtains the identifier of the first C-DF is not specifically limited in this application.

Optionally, in some scenarios, for example, if the terminal device stays or is active in a geographic area for a relatively long time, data of the terminal device may be stored in a home C-DF. The C-DF may be a C-DF associated with the serving RAN device, or may not be a C-DF associated with the serving RAN device. In this case, the serving RAN device obtains an identifier of the home C-DF of the terminal device. In other words, the identifier of the first C-DF is correspondingly the identifier of the home C-DF of the terminal device. It should be understood that the serving RAN device may obtain the identifier of the home C-DF of the terminal device in a plurality of manners. This is not specifically limited in this application.

For a RAN device on which CU-DU division is performed, a CU-CP of the RAN device obtains the identifier of the first C-DF, and sends the identifier of the first C-DF to one or more CP-UPs or one or more DUs. Optionally, the one or more CU-UPs of the RAN device obtain the identifier of the first C-DF, and send the identifier of the first C-DF to the one or more DUs.

502. The serving RAN device sends the identifier of the first C-DF to the terminal device.

In this operation, the serving RAN device may send the identifier of the first C-DF to the terminal device through unicast signaling, or may broadcast the identifier of the first C-DF to a service area.

Optionally, the serving RAN device sends the identifier of the first C-DF to the terminal device through unicast signaling only when the duration in which the terminal device camps on the RAN device is greater than or equal to a second threshold.

For the RAN device on which CU-DU division is performed, the one or more DUs of the RAN device send the identifier of the first C-DF to the terminal device through unicast signaling or through broadcast.

Optionally, this embodiment of this application further includes operation 503 and operation 504.

503. The serving RAN device receives an identifier of a second C-DF that is sent by the terminal device.

The identifier of the second C-DF is used to indicate the C-DF that stores historical data of the terminal device before the terminal device accesses the serving RAN device.

For the RAN device on which CU-DU division is performed, the one or more DUs of the RAN device receive the identifier of the second C-DF that is sent by the terminal device, and send the identifier of the second C-DF to the CU-CP or the one or more CU-UPs.

It should be understood that the identifier of the second C-DF may be the same as the identifier of the first C-DF, or may be different from the identifier of the first C-DF. For example, if a source RAN device and a target RAN device of a handover of the terminal device are in a management area of a same C-DF, the identifier of the second C-DF is the same as the identifier of the first C-DF. If a source RAN device and a target RAN device of a handover of the terminal device are in management areas of different C-DFs, the identifier of the second C-DF is different from the identifier of the first C-DF. If the terminal device enters an idle mode in a service area of a RAN device associated with a C-DF, and enters a connected mode after moving to a service area of a RAN device associated with another C-DF, the identifier of the second C-DF is also different from the identifier of the first C-DF.

Optionally, the serving RAN device may obtain the identifier of the second C-DF from another network entity (for example, a RAN device or a core network device). For example, when the terminal device switches from an idle mode to a connected mode and accesses the serving RAN device, the serving RAN device may obtain, from the core network device, the identifier of the second C-DF that stores the historical data of the terminal device. For example, the serving RAN device obtains the identifier of the second C-DF from the core network device by using an initial UE context setup request message. When the terminal device switches from an inactive mode to a connected mode and accesses the serving RAN device, the serving RAN device may obtain the identifier of the second C-DF from an anchor RAN device serving the terminal device before the terminal device enters the inactive mode. For example, the serving RAN device obtains the identifier of the second C-DF from the anchor RAN device by using a retrieve UE context response message. When the terminal device is handed over from a source RAN device to a target RAN device, the serving RAN device may obtain the identifier of the second C-DF from the source RAN device or the core network device. For example, the serving RAN device obtains the identifier of the second C-DF from the source RAN device by using a handover request message, or obtains the identifier of the second C-DF from the core network device by using a path switch request acknowledgement message.

504. If the identifier of the second C-DF is different from the identifier of the first C-DF, the serving RAN device reports an identifier of the terminal device and the identifier of the second C-DF to the first C-DF.

In this operation, the serving RAN device compares the identifier of the second C-DF that is sent by the terminal device and that is received in the foregoing operation 503 with the identifier of the first C-DF. When the identifier of the second C-DF is different from the identifier of the first C-DF, the serving RAN device reports the identifier of the terminal device and the identifier of the second C-DF to the first C-DF.

Optionally, in operation 402a in the foregoing embodiment, the terminal device sends the identifier of the second C-DF to the serving RAN device only when the identifier of the second C-DF is different from the identifier of the first C-DF, and in operation 504, the serving RAN device directly reports the identifier of the terminal device and the identifier of the second C-DF to the first C-DF associated with the serving RAN device.

For the RAN device on which CU-DU division is performed, the CU-CP or the one or more CU-UPs of the RAN device reports/report the identifier of the terminal device and the identifier of the second C-DF to the first C-DF.

According to the foregoing operations in this embodiment of this application, the serving RAN device can notify the terminal device of the C-DF that stores the current data of the terminal device, and may further learn, from the terminal device, of the C-DF that stores the historical data of the terminal device. In this way, information about a C-DF that stores data of the terminal device is effectively transmitted between the terminal device and the RAN device.

Figure 6:
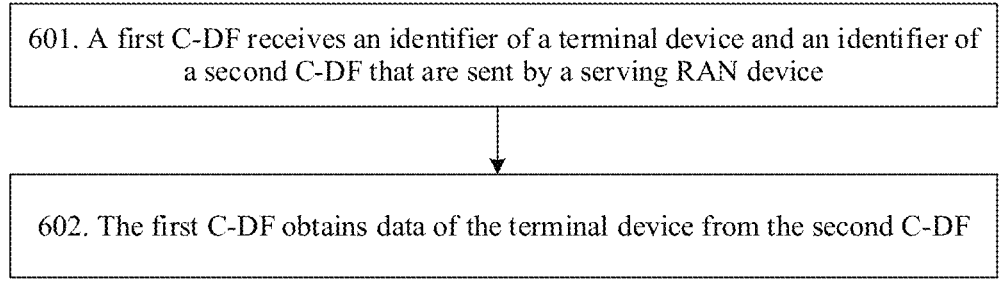
FIG. 6 is a schematic flowchart of still another information transmission method according to an embodiment of this application.

FIG. 6 is a schematic flowchart of an information transmission method according to an embodiment of this application. The method 600 may be applied to a first C-DF to transmit information between C-DFs shown in FIG. 2. A procedure shown in FIG. 6 includes the following operations.

601. The first C-DF receives an identifier of a terminal device and an identifier of a second C-DF that are sent by a serving RAN device.

An identifier of the first C-DF is different from the identifier of the second C-DF that is received by the first C-DF.

It should be understood that, after the terminal device accesses the RAN device and establishes communication, the first C-DF may receive data of the terminal device from the serving RAN device periodically or in a form of event triggering, and store the data. The data is current data of the terminal device. The data may be used by the first C-DF to perform behavior analysis of the terminal device, network optimization, and the like. However, having only the current data of the terminal device is insufficient. If the first C-DF can obtain historical data of the terminal device, the first C-DF can more accurately analyze behavior of the terminal device and further improving network performance. Therefore, the first C-DF needs to learn of a C-DF that stores the historical data of the terminal device.

Optionally, the first C-DF may obtain the identifier of the second C-DF from another network entity (for example, a RAN device or a core network device). For example, when the terminal device switches from an idle mode to a connected mode and accesses the serving RAN device, the first C-DF may obtain, from the core network device, the identifier of the second C-DF that stores the historical data of the terminal device. When the terminal device switches from an inactive mode to a connected mode and accesses the serving RAN device, the first C-DF may obtain the identifier of the second C-DF from an anchor RAN device serving the terminal device before the terminal device enters the inactive mode. When the terminal device is handed over from a source RAN device to a target RAN device, the first C-DF may obtain the identifier of the second C-DF from the source RAN device or the core network device.

602. The first C-DF obtains data of the terminal device from the second C-DF.

In this operation, the first C-DF requests data of the terminal device from the second C-DF based on the identifier of the terminal device and the identifier of the second C-DF that are received in the foregoing operation 601.

Optionally, after obtaining the historical data of the terminal device in the second C-DF, the first C-DF combines the historical data into the current data of the terminal device that is stored in the first C-DF, to update the data of the terminal device that is stored in the first C-DF to combine the current data with the historical data of the terminal device.

According to the foregoing operations in this embodiment of this application, a C-DF associated with the serving RAN device accessed by the terminal device can obtain the historical data of the terminal device from another C-DF. In this way, data of the terminal device is effectively transmitted between different C-DFs.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like. A person skilled in the art may use different methods to implement the described functions for each particular application, but it should not be considered that the implementation goes beyond the scope of this application.

The foregoing describes in detail the method embodiments of this application with reference to FIG. 4 to FIG. 6. The following describes in detail apparatus embodiments of this application with reference to FIG. 7 to FIG. 12. It should be understood that the apparatus embodiments and the method embodiments correspond to each other. For similar descriptions, refer to the method embodiments. It should be noted that the apparatus embodiments may be used in conjunction with the foregoing methods, or may be independently used.

Figure 7:
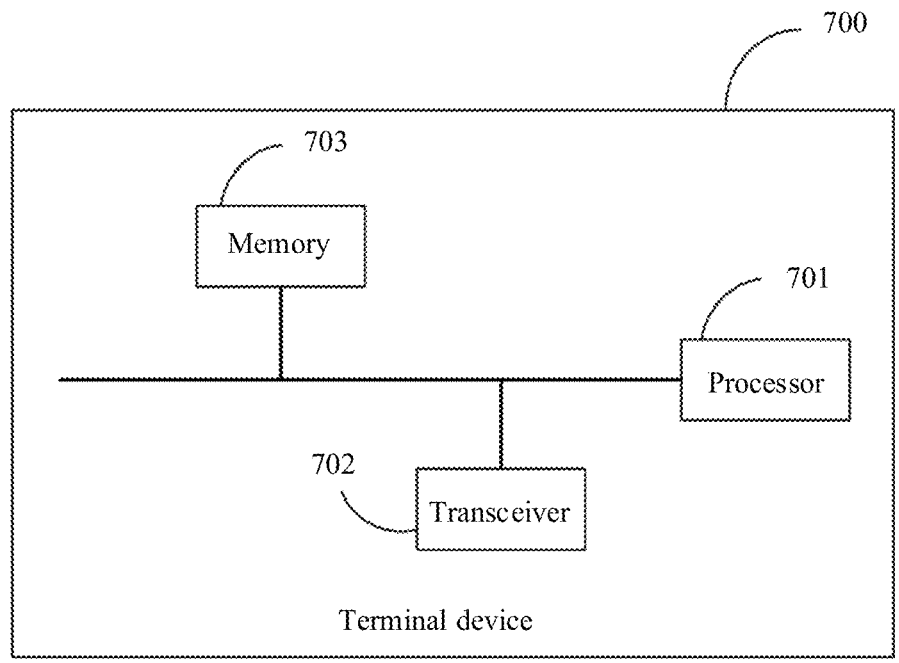
FIG. 7 is a schematic block diagram of a terminal device according to an embodiment of this application.

FIG. 7 is a schematic block diagram of a terminal device 700 according to an embodiment of this application. The terminal device 700 may correspond to (for example, may be configured on or may be) the terminal device described in the foregoing method 400. The terminal device 700 may include a processor 701 and a transceiver 702. The processor 701 is communicatively coupled to the transceiver 702. Optionally, the terminal device 700 further includes a memory 703. The memory 703 is communicatively coupled to the processor 701. Optionally, the processor 701, the memory 703, and the transceiver 702 may be communicatively coupled. The memory 703 may be configured to store an instruction. The processor 701 is configured to execute the instruction stored in the memory 703, to control the transceiver 702 to receive and/or send information or a signal. The processor 701 and the transceiver 702 are separately configured to perform actions or processing processes performed by the terminal device in the foregoing method 400. Herein, to avoid repetition, detailed descriptions thereof are omitted.

Figure 8:
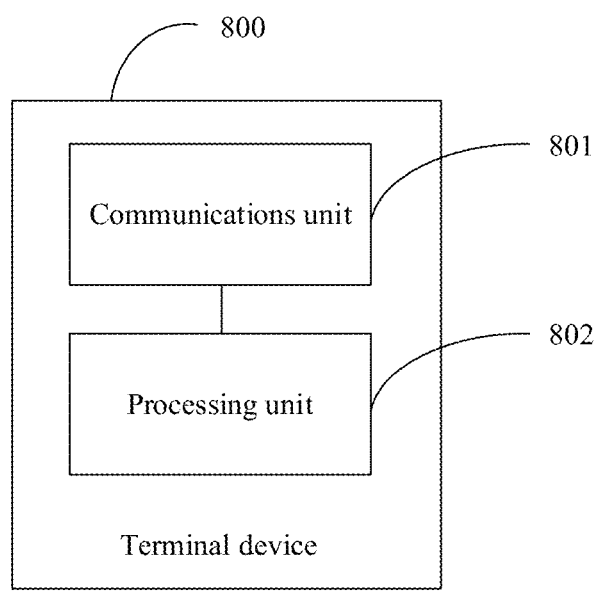
FIG. 8 is another schematic block diagram of a terminal device according to an embodiment of this application.

FIG. 8 is another schematic block diagram of a terminal device 800 according to an embodiment of this application. The terminal device 800 may correspond to (for example, may be configured on or may be) the terminal device described in the foregoing method 400. The terminal device 800 may include a communications unit 801 and a processing unit 802. The processing unit 802 is communicatively coupled to the communications unit 801. In this embodiment of this application, the terminal device 800 is presented in a form of function units. The "unit" herein may be a processor and a memory for executing one or more software or firmware programs, an integrated logic circuit, and/or another component that can provide the foregoing function. The terminal device may use a form shown in FIG. 8. The processing unit 802 may be implemented by using the processor 701 in FIG. 7. The communications unit 801 may be implemented by using the transceiver 702 in FIG. 7. The terminal device 800 may further include a storage unit, configured to store a program to be executed by the processing unit 802 or data, or store information received and/or sent by using the communications unit 801. Each module or unit in the terminal device 800 is configured to perform each action or processing process performed by the terminal device in the foregoing method 400. Herein, to avoid repetition, detailed descriptions thereof are omitted.

Figure 9:
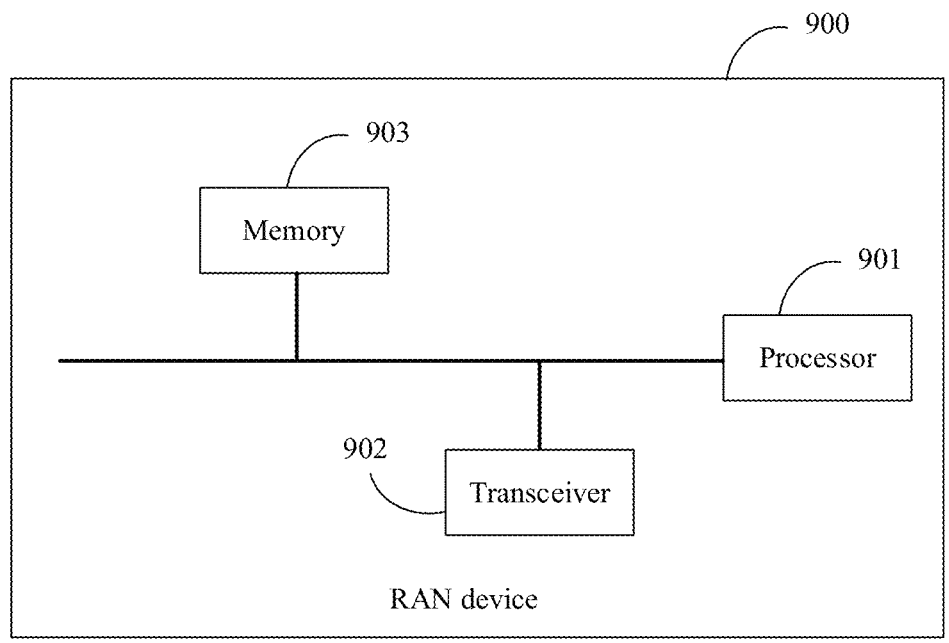
FIG. 9 is a schematic block diagram of an access network device according to an embodiment of this application.

FIG. 9 is a schematic block diagram of a RAN device 900 according to an embodiment of this application. The RAN device 900 may correspond to (for example, may be configured on or may be) the serving RAN device described in the foregoing method 500. The RAN device 900 may include a processor 901 and a transceiver 902. The processor 901 is communicatively coupled to the transceiver 902. Optionally, the RAN device 900 further includes a memory 903. The memory 903 is communicatively coupled to the processor 901. Optionally, the processor 901, the memory 903, and the transceiver 902 may be communicatively coupled. The memory 903 may be configured to store an instruction. The processor 901 is configured to execute the instruction stored in the memory 903, to control the transceiver 902 to receive and/or send information or a signal. The processor 901 and the transceiver 902 are separately configured to perform actions or processing processes performed by the serving RAN device in the foregoing method 500. Herein, to avoid repetition, detailed descriptions thereof are omitted.

Figure 10:
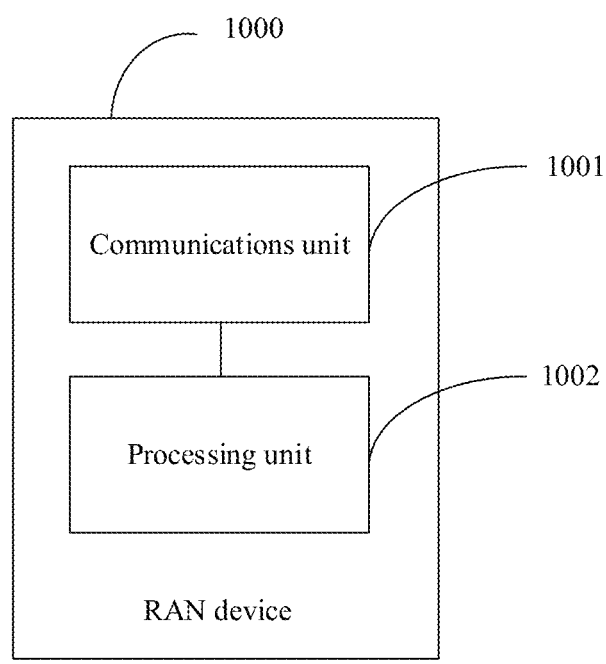
FIG. 10 is another schematic block diagram of an access network device according to an embodiment of this application.

FIG. 10 is another schematic block diagram of a RAN device 1000 according to an embodiment of this application. The RAN device 1000 may correspond to (for example, may be configured on or may be) the serving RAN device described in the foregoing method 500. The RAN device 1000 may include a communications unit 1001 and a processing unit 1002. The processing unit 1002 is communicatively coupled to the communications unit 1001. In this embodiment of this application, the RAN device 1000 is presented in a form of function units. The "unit" herein may be a processor and a memory for executing one or more software or firmware programs, an integrated logic circuit, and/or another component that can provide the foregoing function. The RAN device may use a form shown in FIG. 10. The processing unit 1002 may be implemented by using the processor 901 in FIG. 9. The communications unit 1001 may be implemented by using the transceiver 902 in FIG. 9. The RAN device 1000 may further include a storage unit, configured to store a program to be executed by the processing unit 1002 or data, or store information received and/or sent by using the communications unit 1001. Each module or unit in the RAN device 1000 is configured to perform each action or processing process performed by the serving RAN device in the foregoing method 500. Herein, to avoid repetition, detailed descriptions thereof are omitted.

Figure 11:
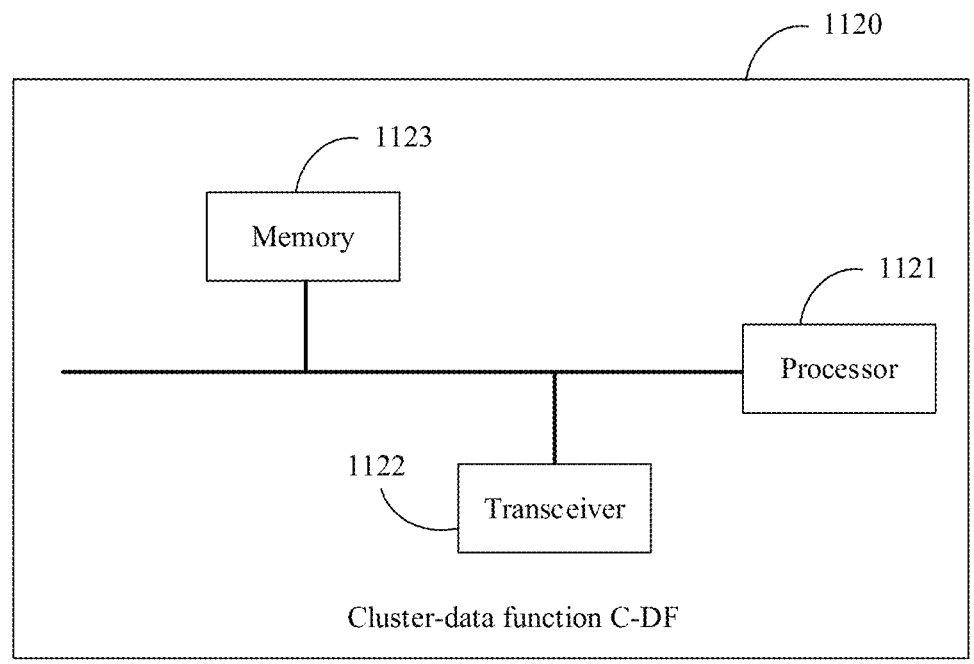
FIG. 11 is a schematic block diagram of a cluster-data function according to an embodiment of this application.

FIG. 11 is a schematic block diagram of a C-DF 1100 according to an embodiment of this application. The C-DF 1100 may correspond to (for example, may be configured on or may be) the first C-DF or the second C-DF described in the foregoing method 600. The C-DF 1100 may include a processor 1101 and a transceiver 1102. The processor 1101 is communicatively coupled to the transceiver 1102. Optionally, the C-DF 1100 further includes a memory 1103. The memory 1103 is communicatively coupled to the processor 1101. Optionally, the processor 1101, the memory 1103, and the transceiver 1102 may be communicatively coupled. The memory 1103 may be configured to store an instruction. The processor 1101 is configured to execute the instruction stored in the memory 1103, to control the transceiver 1102 to receive and/or send information or a signal. The processor 1101 and the transceiver 1102 are separately configured to perform actions or processing processes performed by the first C-DF or the second C-DF in the foregoing method 600. Herein, to avoid repetition, detailed descriptions thereof are omitted.

Figure 12:
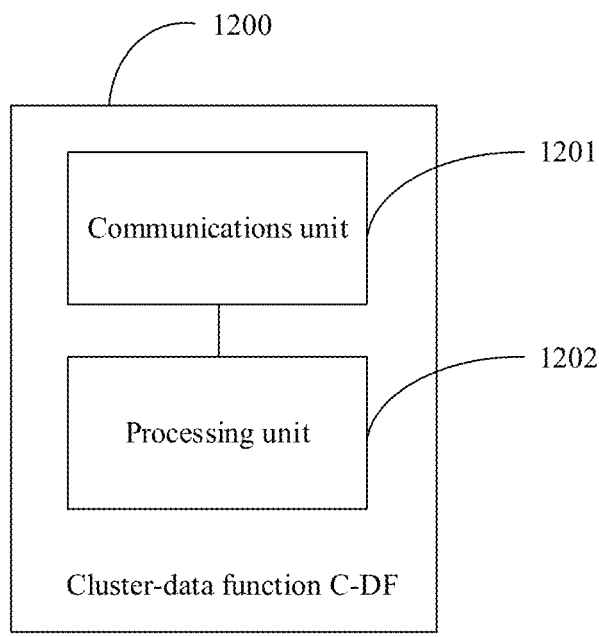
FIG. 12 is another schematic block diagram of a cluster-data function according to an embodiment of this application.

FIG. 12 is another schematic block diagram of a C-DF 1200 according to an embodiment of this application. The C-DF 1200 may correspond to (for example, may be configured on or may be) the first C-DF or the second C-DF described in the foregoing method 600. The C-DF 1200 may include a communications unit 1201 and a processing unit 1202. The processing unit 1202 is communicatively coupled to the communications unit 1201. In this embodiment of this application, the C-DF 1200 is presented in a form of function units. The "unit" herein may be a processor and a memory for executing one or more software or firmware programs, an integrated logic circuit, and/or another component that can provide the foregoing function. The C-DF may use a form shown in FIG. 12. The processing unit 1202 may be implemented by using the processor 1101 in FIG. 11. The communications unit 1201 may be implemented by using the transceiver 1102 in FIG. 11. The C-DF 1200 may further include a storage unit, configured to store a program to be executed by the processing unit 1202 or data, or store information received and/or sent by using the communications unit 1201. Each module or unit in the C-DF 1200 is configured to perform each action or processing process performed by the first C-DF or the second C-DF in the foregoing method 600. Herein, to avoid repetition, detailed descriptions thereof are omitted.

It should be understood that the processors (701, 901, and 1101) in the apparatus embodiments of this application each may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memories (703, 903, and 1103) in the apparatus embodiments of this application each may be a volatile memory, for example, a random access memory (RAM); or may be a non-volatile memory, for example, a read-only memory (ROM), a flash memory, a hard disk drive (HDD), or a solid-state drive (SSD); or may be a combination of the foregoing types of memories.

In the several embodiments provided in this application, it should be understood that the disclosed apparatus and method may be implemented in other manners. For example, the described apparatus embodiment is merely an example. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device, comprising at least one processor, a transceiver coupled with the at least one processor, and a non-transitory computer-readable storage medium coupled with the at least one processor and configured to store a program including instructions that, when being executed by the at least one processor, cause the at least one processor to:
   access a serving radio access network (RAN) device;
   receive an identifier of a first cluster-data function (C-DF) from the serving RAN device through unicast signaling or in a broadcast message sent by the serving RAN device, wherein the serving RAN device is associated with the first C-DF, and the first C-DF is located in a radio access network and stores current data of the terminal device; and
   store the identifier of the first C-DF when a duration in which the terminal device camps on the serving RAN device is greater than or equal to a first threshold.

2. The terminal device according to claim 1, wherein the instructions that, when being executed by the at least one processor, further cause the at least one processor to:
   when the duration in which the terminal device camps on the serving RAN device is greater than or equal to a second threshold, receive, through unicast signaling, the identifier of the first C-DF from the serving RAN device.

3. The terminal device according to claim 1, wherein the instructions that, when being executed by the at least one processor, further cause the at least one processor to:
   store an identifier of a second C-DF, wherein the identifier of the second C-DF is stored by the terminal device before the terminal device accesses the serving RAN device; and
   send the identifier of the second C-DF to the serving RAN device.

4. The terminal device according to claim 3, wherein the instructions that, when being executed by the at least one processor, further cause the at least one processor to:
   when the duration in which the terminal device camps on the serving RAN device is greater than or equal to the first threshold, replace the identifier of the second C-DF with the identifier of the first C-DF.

5. The terminal device according to claim 3, wherein the identifier of the second C-DF is an identifier of a home C-DF of the terminal device.

6. A radio access network (RAN) device, comprising at least one processor, a transceiver coupled with the at least one processor, and a non-transitory computer-readable storage medium coupled with the at least one processor and configured to store a program including instructions that, when being executed by the at least one processor, cause the at least one processor to:
   obtain an identifier of a first cluster-data function (C-DF) associated with the RAN device, wherein the first C-DF is located in a radio access network and stores current data of a terminal device; and
   send the identifier of the first C-DF to the terminal device through unicast signaling or via a broadcast message broadcast in a service area.

7. The RAN device according to claim 6, wherein the instructions that, when being executed by the at least one processor, further cause the at least one processor to:
   when the duration in which the terminal device camps on the serving RAN device is greater than or equal to a second threshold, send the identifier of the first C-DF to the terminal device through unicast signaling.

8. The RAN device according to claim 6, wherein the instructions that, when being executed by the at least one processor, further cause the at least one processor to:
   receive an identifier of a second C-DF from the terminal device.

9. The RAN device according to claim 8, wherein the instructions that, when being executed by the at least one processor, further cause the at least one processor to:

when the identifier of the second C-DF is different from the identifier of the first C-DF, report an identifier of the terminal device and the identifier of the second C-DF to the first C-DF.

10. The RAN device according to claim 6, wherein the identifier of the first C-DF is an identifier of a home C-DF of the terminal device.

11. A cluster-data function (C-DF), comprising at least one processor, a transceiver coupled with the at least one processor, and a non-transitory computer-readable storage medium coupled with the at least one processor and configured to store a program including instructions that, when being executed by the at least one processor, cause the at least one processor to:
receive an identifier of a terminal device and an identifier of a second C-DF from at least one RAN device associated with the C-DF, through unicast signaling or via a broadcast message sent by the at least one RAN device, wherein the C-DF is located in a radio access network and stores current data of the terminal device, and an identifier of the C-DF is different from the identifier of the second C-DF; and
obtain data of the terminal device from the second C-DF.

* * * * *